Dec. 13, 1960

H. D. IRVIN 2,964,680

GAS DIODE FLIP-FLOP OR REGISTER CIRCUIT

Filed Oct. 31, 1957

INVENTOR
H. D. IRVIN
BY E. W. Adams, Jr.
ATTORNEY 2,964,680

GAS DIODE FLIP-FLOP OR REGISTER CIRCUIT

Henry D. Irvin, Watchung, N.J., assignor to Bell Telephone Laboratories, Incorporated, New York, N.Y., a corporation of New York Filed Dec. 31, 1957, Ser. No. 706,433

8 Claims. (Cl. 315—166)

This invention relates to dialing equipment for telephone subscriber subsets and more particularly to circuitry for push-button dialing.

In preliminary studies involving push-button dialing, some users have found difficulty in dialing properly, resulting in an excessive number of wrong numbers and incomplete calls. When a user presses on a non-locking type push-button corresponding to the digit which he has selected and he does not press with much force, he is not sure whether he has momentarily closed the corresponding circuit and has thereby successfully dialed that digit or not and is likely to become confused. He then either presses the same button again, assumes that he has successfully dialed that digit and continues, or hangs up and starts all over. It is apparent that this confusion can lead to all types of improper dialing resulting in undue tie-up and inefficiency in the utilization of central office switching equipment. Since one of the purposes of push-button dialing is to reduce the dialing time and thereby increase the efficiency in the utilization of central office equipment, it is imperative that such difficulties be minimized. In certain types of push-button dialing equipment it was found that this difficulty was due in part to lack of kinesthetic feedback reinforcement or in other words the sense of touch was not sufficient to indicate to the user that he had depressed the push-button sufficiently to have successfully dialed his selected digit.

Another source of difficulty and one which prevails not only with the push-button type of dialing but also with the present rotatable dial is that the user in dialing a subscriber number which has an extensive number of digits sometimes becomes confused as to which was the last digit that he dialed, thereby resulting in incomplete calls, wrong numbers and re-dialing. In order to provide a commercially acceptable solution to the aforementioned problems it is evident that any device produced for this purpose must be simple, inexpensive, and require the least possible maintenance since this device would necessarily be located with the user or subscriber equipment rather than at the central office.

It is therefore an object of this invention to increase the efficiency of central office switching equipment which utilizes push-button dialing by increasing the percentage of properly dialed calls.

Another object of this invention is to aid a user who is operating a push-button dial telephone in properly dialing the number he has selected.

A preferred embodiment of the invention is an array of push-buttons and glow discharge tubes arranged in a convenient manner to comprise a self-clearing, visual read-out register which "remembers" each input pulse or event until the next input event. When a user selects a desired digit and presses on the corresponding push-button, nothing happens until the push-button has been depressed sufficiently to have successfully dialed the digit, and at that moment a glow discharge tube corresponding to the dialed digit fires and glows brightly until the user releases the push-button, and then glows dimly until the next input event, that is until the next desired digit is selected and its corresponding push-button depressed sufficiently. The process repeats itself except that as soon as the glow discharge tube corresponding to the then selected digit begins to conduct, the glow discharge tube corresponding to the last selected digit is extinguished. Therefore, it can be seen that this device not only indicates when and if the selected digit has been successfully dialed but also "remembers" the last digit dialed as well.

The invention is described in more detail in the following discussion relating to the drawing in which.

Figure 1:
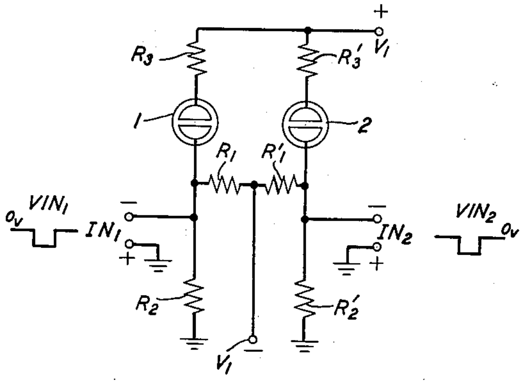
Fig. 1 is the basic form of the self-clearing, visual read-out register and has many characteristics of a flip-flop circuit.

In Fig. 1 there is shown the basic form of the self-clearing, visual read-out register as arranged for two control inputs. In this form the register, which has many of the characteristics of a flip-flop circuit, is comprised of gas-filled glow tubes 1 and 2, anode resistors $R_3$ and $R_{3'}$, cathode resistors $R_2$ and $R_{2'}$, cathode-interconnecting resistors $R_1$ and $R_{1'}$ and a source of holding or sustaining voltage indicated at $V_1$. The holding voltage $V_1$ is high enough to maintain tubes 1 and 2 conducting when they are in a conducting state, but not high enough to initiate glow discharge. If we apply a pulse $VIN_1$ of the polarity shown in Fig. 1 to input $IN_1$, it will appear across resistor $R_2$ and divide among resistors $R_1$, $R_{1'}$ and $R_{2'}$. If the input pulse $VIN_1$ at input $IN_1$ is of sufficient amplitude it will fire tube 1 because the voltage drop across resistor $R_1$ will add to and increase the voltage from plate to cathode of tube 1. However, because of the polarities involved tube 2 will "see" the holding or sustaining voltage $V_1$ minus the voltage drop across resistor $R_{1'}$ and therefore will not fire.

As soon as tube 1 fires there is an instantaneous drop in voltage across tube 1 because the whole of the sustaining voltage $V_1$ is no longer across tube 1 but is divided among the resistor $R_3$, tube 1 and resistor $R_1$. But also adding to the voltage across tube 1 at this time is the voltage across resistor $R_1$ which is caused by the input voltage $VIN_1$ which is applied to input $IN_1$. At this time the glow discharge tube 1 will glow with a first level of illumination which will be called "brightly." As soon as the pulse $VIN_1$ is removed from the input $IN_1$ that part of the voltage which was due to the voltage $VIN_1$ and appeared across resistor $R_1$ no longer exists and does not add to the voltage drop across tube 1 and tube 1 therefore glows with a second level of illumination which will be called "dimly."

Now if we apply an input pulse $VIN_2$ to input $IN_2$ of the polarity shown in Fig. 1, it will appear across resistor $R_{2'}$ and be divided among resistors $R_{1'}$, $R_1$ and $R_2$. Tube 2 will "see" the sustaining voltage $V_1$ plus the voltage drop across resistor $R_{1'}$ due to the polarity of the voltage $VIN_2$ at input $IN_2$ and if the voltage drop across resistor $R_{1'}$ is of sufficient amplitude, tube 2 will begin glow discharge. Tube 1 will see its operating voltage minus the voltage across resistor $R_1$ and with the resistors $R_1$, $R_{1'}$ and $R_2$ chosen properly will have its electrode potential difference reduced to such a value that it will be extinguished. The next pulse at input $IN_1$ will cause tube 1 to fire and tube 2 to extinguish, and so on, in typical flip-flop fashion.

Figure 2:
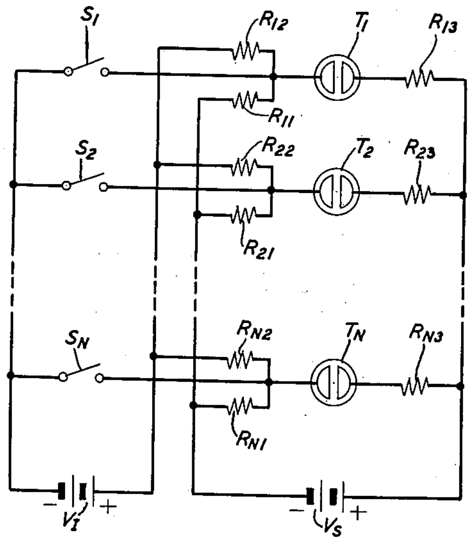
Fig. 2 is a general form of the self-clearing, visual read-out register of any number of inputs.

Three or more of the tube circuits of Fig. 1 may be connected to form a self-clearing register such as that shown in Fig. 2. In Fig. 2 the holding voltage is supplied by a battery $V_6$ common to all tubes and the firing potential $V_I$ is shown supplied by another battery through individual input switches $S_1$, $S_2$ . . . $S_n$. Whenever any one of the input switches is momentarily closed, the glow tube associated with it will begin conducting and will glow brightly as long as the input switch is closed. This occurs because part of the firing voltage $V_I$ will appear across that tube in aid of sustaining voltage $V_s$. Also any other tube previously conducting will be extinguished because part of firing voltage $V_I$ will appear across every other tube but in such a manner as to subtract from the existing voltage across these tubes and when the firing voltage $V_I$ is of sufficient magnitude it will extinguish any conducting tube. As soon as the selected input switch is opened the glow tube then conducting will continue to conduct but will glow dimly since the removal of the firing voltage $V_I$ removes that part of that voltage that appeared across the tube. Thus, the circuit has self-clearing register action and it also "remembers" the most recent input event.

The read-out from the circuit may be visual, or it may be electrical and non-destructive or both. For electrical read-out in the foregoing example, the drop across any of resistors $R_{13}$, $R_{23}$ . . . $R_{n3}$ is zero for nonconducting tubes, a first predetermined value for a conducting tube which has its input switch momentarily closed and a second predetermined value after the momentarily closed switch is released. The circuit is degenerative in that the output voltage is less than the input.

Figure 3:
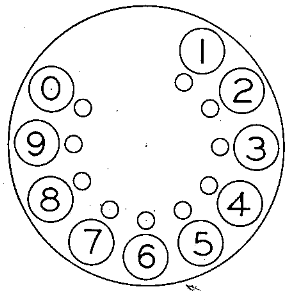
Fig. 3 is an illustration of a push-button dial face employing a ten-tube, self-clearing register circuit of the type illustrated in Fig. 2.

Referring now to Fig. 3 there is illustrated a preferred form of the invention which comprises a dial face having ten non-locking push-buttons each representing a digit and each having associated therewith a glow discharge tube. When a user selects a digit and presses on the push-button corresponding to that digit with sufficient force the glow tube associated therewith glows brightly for reasons previously described and when the user releases the push-button the glow tube continues to glow but dimly this time. When the user selects the next digit and causes the associated glow tube to glow brightly, the tube associated with the last selected digit and which was glowing dimly is extinguished and so on.

For purposes of simplicity in a general circuit explanation applicable to both Fig. 1 and Fig. 2, let us assume that resistors $R_1 = R_{1'} = R_{11} = R_{21} = R_{n1}$, $$R_2 = R_{2'} = R_{12} = R_{22} = R_{n2},$$

and $R_3 = R_{3'} = R_{13} = R_{23} = R_{n3}$, and therefore they may be referred to as simply $R_1$, $R_2$ and $R_3$, respectively. Let $V_I$ be the input voltage, $V_F$ be the minimum electrode voltage required to initiate glow discharge in a tube, $V_M$ be the minimum electrode voltage at which glow discharge may be maintained, and $V_S$ be the sustaining or holding potential. Then the differential control voltage is given by $$\Delta V = V_F - V_M \quad (1)$$

For the case of two tubes as shown in Fig. 1, the minimum value of $R_3$ is set by the maximum current $I_{max}$ which can be allowed to flow through the glow tube. If we assume the worst possible condition namely, that the tube has zero internal resistance, we have $$I_{max} = \frac{V_s(2R_1 + R_2) + V_I R_1}{R_1^2 + 2R_1R_3 + R_2R_3 + R_1R_2} \quad (2)$$

and $$R_3 = \frac{V_s(2R_1 + R_2) + V_I R_1 - I_{max}(R_1^2 + R_1R_2)}{I_{max}(2R_1 + R_2)} \quad (3)$$

is the minimum permissible value of $R_3$. In practice, $R_3$ will usually be several times this value.

$R_1$ and $R_2$ have been chosen equal for simplicity in discussing circuit action. However, it will be found desirable to make $R_2 < R_1$ so that as much of the input voltage as possible may be supplied to the glow tube holding circuits through the $R_1$'s. The lower limit to $R_2$ is set by the fact that as $R_2 \rightarrow 0$, so does the input resistance of the circuit. A ratio $R_2:R_1:R_3::1:10:100$ should be usable if the resultant low input resistance can be tolerated. For the two-tube flip-flop the input resistance is given by $$R_I = \frac{2R_1R_2 + R_2^2}{2(R_1 + R_2)} \quad (4)$$

For the case of $n$ tubes as in Fig. 2, this generalizes very simply to $$R_I = \frac{nR_1R_2 + R_2^2}{n(R_1 + R_2)} \quad (5)$$

For the two-tube case, a good choice for the holding voltage $V_S$ is midway between firing and extinguishing, i.e.

$$V_S = V_M + \frac{\Delta V}{2} \quad (6)$$

This sets the minimum input voltage requirement at $$V_I = (2R_1 + R_2)\frac{\Delta V}{2R_1} \quad (7)$$

An input voltage greater than this should be chosen for reliability of circuit operation.

For $n>2$, $V_I$ must be increased further in order to be certain of extinguishing all other glow tubes while initiating discharge in the desired one. Some help in this regard might be gained by making $V_S$ less than the value given by (6), but the limit here is that, necessarily $$V_S \geqq V_M \quad (8)$$

The assumption has been implicit here that the characteristics of all $n$ glow tubes were identical. In actuality this is never the case. The effect of variations in tube characteristics is to reduce $\Delta V$ for the entire circuit. Tubes should be selected and perhaps also should be aged.

From the foregoing discussion it is apparent that the user is aided substantially in properly dialing his selected number. First of all the lack of kinesthetic feedback reinforcement or the inability of his sense of touch to relate back to him when he has successfully dialed a digit is partially cured by visual feedback when the glow discharge tube glows brightly upon activation. Secondly the user is aided in remembering what digit he has dialed last by the glow tube radiating dimly until the next digit is successfully dialed. Thirdly the lack of either the bright indication or dim indication denotes that neither condition associated with these indications is present thereby also giving information to the user.

What is claimed is:

1. In a push-button signaling system, an array of non-locking push-button switches corresponding to a selected number of digits, an array of glow discharge tubes associated with said push-button switches, resistive circuit means for interconnecting said tubes and said push-button switches, means for applying a firing potential, by closing a selected push-button switch, to the glow discharge tube associated with said selected switch to cause said associated tube to provide a first indication, and means for applying a sustaining potential to provide a second indication when said selected push-button switch is subsequently opened.

2. A push-button signaling system as in claim 1 wherein said resistive circuit means causes said associated glow tube to provide a third indication responsive to the closing of the next selected push-button switch.

3. A push-button signaling system as in claim 2 wherein said first indication is a visible light of a first level of illumination and said second indication is a visible light of a distinguishable second level of illumination and said third indication is the absence of any illumination.

4. A push-button signaling system as in claim 2 wherein said first indication is an electrical potential of a first value and said second indication is an electrical potential of a second value and said third indication is an electrical potential of a third value.

5. In combination, a plurality of gas-filled tubes, a first source providing a sustaining potential for said tubes, a resistive network interconnecting said tubes, an input lead associated with each tube and its corresponding position in said resistive network, a source of firing potential, and means for selectively connecting said firing potential to any of said input leads whereby said firing potential is applied to said resistive network, said resistive network causing part of said firing potential to add to the sustaining potential across the tube associated with said selected lead and to subtract from the sustaining potential across the remainder of said tubes, whereby the tube associated with the selected lead is fired and the remainder of said tubes is extinguished.

6. In combination, a plurality of gas-filled tubes, a first source providing a sustaining potential for said tubes, an input lead associated with each of said tubes, a source of firing potential, means for selectively connecting said firing potential to any of said input leads, and resistive means for interconnecting said tubes such that part of said firing potential is added to the sustaining potential across the tube associated with said selected lead and subtracted from the sustaining potential across the remainder of said tubes, whereby the tube associated with the selected lead is fired and the remainder of said tubes is extinguished.

7. In combination, a pair of gas-filled diode tubes, a first source of sustaining potential for said tubes, an input lead associated with each of said tubes, a source of switching potential, means for alternately applying said switching potential to said input leads, and resistive means for interconnecting said tubes such that part of said switching potential is added to the sustaining voltage across the tube associated with the lead having the switching potential thereon and part of said switching potential is subtracted from the sustaining potential across the other tube, whereby one tube is alternately switched "on" and the other "off."

8. In combination, a plurality of gas-filled diodes, a first source providing a sustaining potential for said tubes, an input lead associated with each of said tubes, a firing potential, means for selectively connecting said firing potential to any of said input leads, and a resistive network interconnecting the cathodes of said tubes in such a manner that part of said firing potential is added to the sustaining potential across the tube associated with the selected lead and part of said firing potential is subtracted from the sustaining potential across the remainder of said tubes, whereby the tube associated with the selected lead is fired and the remainder of said tubes is extinguished.

References Cited in the file of this patent

UNITED STATES PATENTS

| | | |
|---|---|---|
| 1,107,140 | Clement | Aug. 11, 1914 |
| 2,299,229 | Hall | Oct. 20, 1942 |
| 2,349,129 | Albert | May 16, 1944 |
| 2,367,522 | Pfleger | Jan. 16, 1945 |
| 2,390,203 | Campbell | Dec. 4, 1945 |
| 2,658,142 | St. John | Nov. 3, 1953 |
| 2,861,220 | Obolensky | Nov. 18, 1958 |

FOREIGN PATENTS

| | | |
|---|---|---|
| 943,597 | France | Mar. 11, 1949 |